June 3, 1969 G. G. SOLYMAR 3,447,689
BELLOWS FILTER
Filed Nov. 8, 1967 Sheet 3 of 3

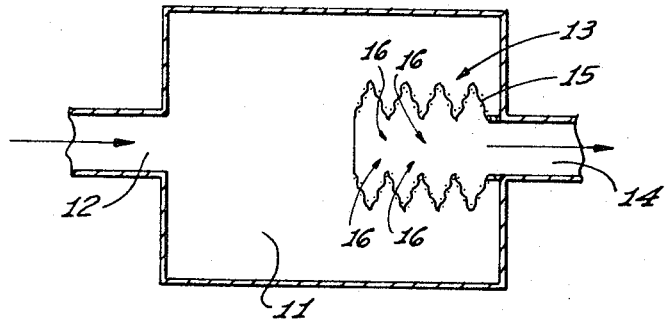
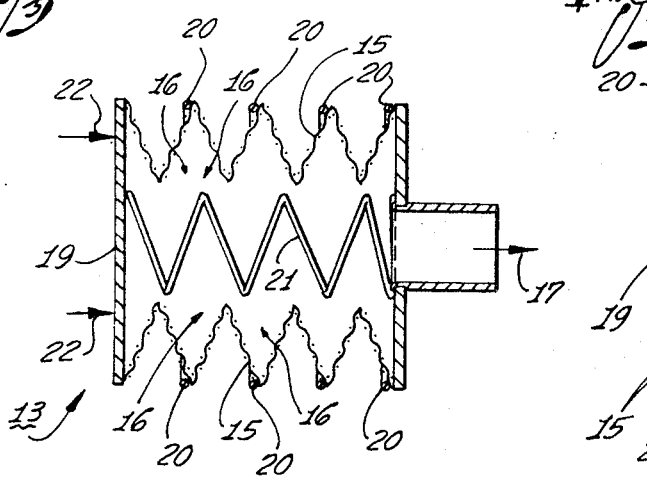
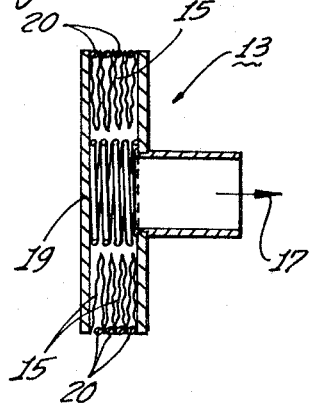

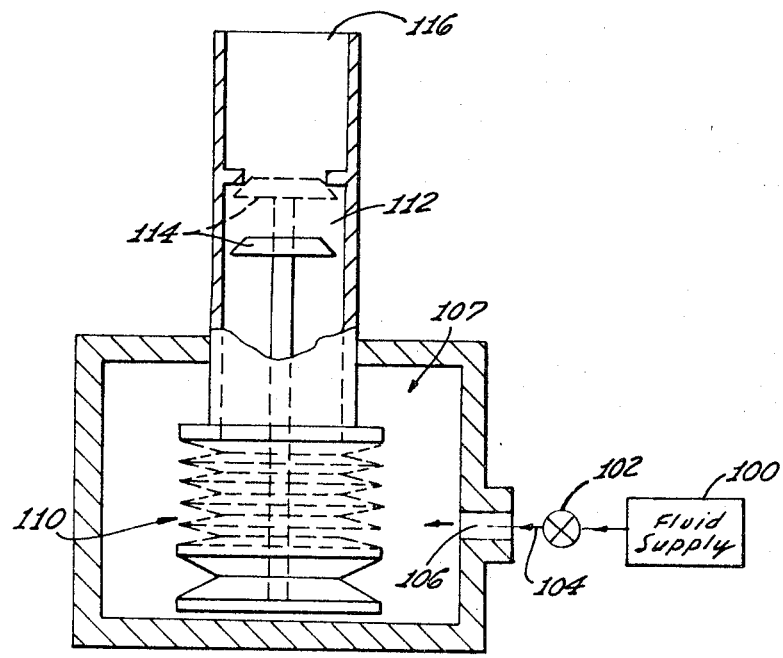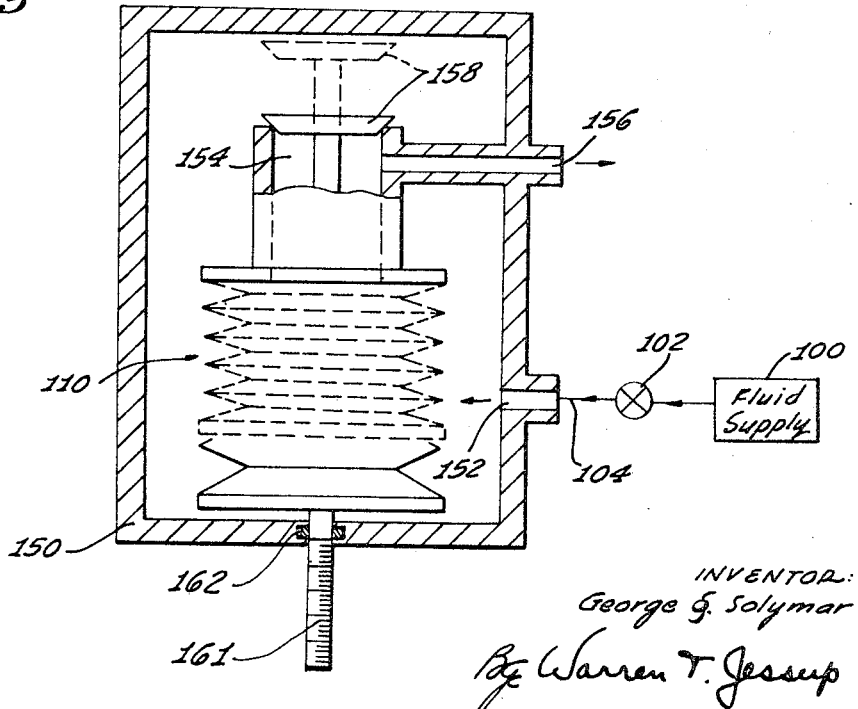

INVENTOR:
George G. Solymar
By Warren T Jessup
ATTORNEY

United States Patent Office 3,447,689
Patented June 3, 1969

3,447,689
BELLOWS FILTER
George G. Solymar, North Hollywood, Calif., assignor to Aerospace Components Corporation, Los Angeles, Calif., a corporation of Delaware
Continuation-in-part of application Ser. No. 581,881, Sept. 26, 1966. This application Nov. 8, 1967, Ser. No. 685,233
Int. Cl. B01d 25/02, 39/12
U.S. Cl. 210—356         4 Claims

ABSTRACT OF THE DISCLOSURE

A compressible bellows filter comprising a plurality of sections. Each section includes opposed flat radially pleated sides extending between inner and outer tubular members. A sealing member is mounted on each outer member to seal the edges of the sections when the filter becomes fully compressed.

---

This application is a continuation-in-part of copending application Ser. No. 581,881, which was filed Sept. 26, 1966, now abandoned.

Background of the invention

It will be appreciated that when the straining element of a filter is interposed in a stream of pressurized fluid in order to remove solid particles from the fluid, the straining element will in time become clogged with the particles. As the straining element becomes more and more clogged with particles, the differential pressure across the filter increases. This increase in differential pressure across the filter as the filter straining element becomes clogged results in a tendency for the prior art elements to rupture, which can lead to drastic consequences.

The embodiment of the filter to be described herein is in the form of a porous, compressible bellows, having an end disc and a straining element in the form of a porous pleated tubular side member. An internal spring tends to maintain the bellows in an expanded condition. However, as the differential pressure across the filter increases due to clogging of the straining element, or for other reasons, the bellows tends to compress against the force of the internal spring. Then, as the filter is compressed, the pleated straining element continues to perform its straining function. However, after the clogging is such that the differential pressure across the filter exceeds a predetermined threshold, the filter becomes completely compressed, thereby protecting the pleated straining element thereof from rupture.

The bellows-type filter of the present invention may be mechanically coupled to an appropriate valve, if so desired, and it may function to control the valve so as to terminate the flow of pressurized fluid, or otherwise reduce the differential pressure across the filter, when the filter is compressed. A prime object of the invention, therefore, is to convert increases in differential pressure across the filter, which results due to clogging of the filter straining element, into linear motion which is employed in any desired manner to protect the filter element. In this manner, the improved filter of the invention, which is used for straining entrained solid particles from a pressurized fluid stream, is capable of self-protection against rupture as the pressure differential thereacross increases beyond a predetermined threshold.

Summary of the invention

The invention provides a filter in the form, for example, of a porous compressible bellows, having an end disc, and a porous tubular straining element with peripheral pleats. An internal spring tends to maintain the bellows in an expanded condition. As the differential pressure across the filter increases, due to clogging of the straining element, or for other reasons, the bellows tends to compress against the force of the internal spring. Therefore, the filter is responsive to differential pressures across it, so as to perform predetermined mechanical operations as will be described in detail herein.

The resulting filter of the invention is advantageous in that it is compact and inexpensive and yet it is rugged and durable and capable of withstanding high differential pressures without rupture. Also as will be described the improved filter of the invention is readily demountable for cleaning purposes. The filter of the invention responds to changes in differential pressure across it not only to produce a compressive effect to protect the filter element, but also to perform other functions, such as changing the rate of flow of the fluid through the filter straining element. This change in fluid flow may be achieved by causing the filter to actuate a shut-off valve, by-pass valve, or the like, thereby to prevent further pressure build-up across the filter, as will be described.

Brief description of the drawings

FIGURE 1 is a side sectional representation of a filter assembly incorporating the concepts of the present invention;

FIGURE 2 is a side sectional representation of the filter included in the assembly of FIGURE 1, and on a somewhat enlarged scale, with the filter being shown in its expanded condition;

FIGURE 3 is a side sectional representation of the filter in its compressed condition;

FIGURE 4 is a sectional view of a further filter assembly incorporating a filter embodying the invention, and in which the filter is coupled to a shut-off valve for reasons to be described;

FIGURE 5 is a sectional view of a further filter assembly, also incorporating a filter constructed in accordance with the concepts of the invention, and in which the filter is coupled to a by-pass valve for reasons to be described;

Detailed description of the illustrated embodiments

Figure 6:
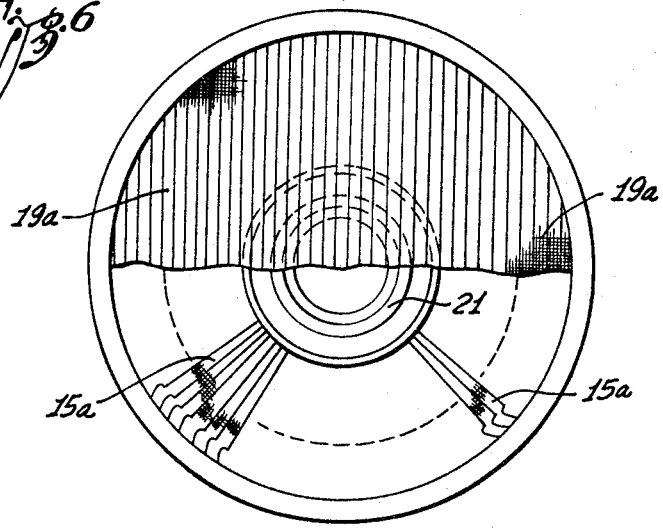
FIGURE 6 is an end view of a modified filter representing another embodiment of the invention and which incorporates a round straining element having radial pleats.

The filter assembly of FIGURE 1 includes a chamber 11 having an inlet 12 and an outlet 14. A pressurized stream of fluid flows through the chamber 11 from the inlet to the outlet. The stream of fluid (either liquid or gas) contains entrained solid particles which are removed therefrom by the filter assembly.

A filter 13, constructed in accordance with the concepts of the present invention, is disposed across the outlet 14 of the assembly of FIGURE 1. The filter 13 is made in the form of a flexible bellows having, for example, a tubular straining element 15 with peripheral accordion pleats formed therein. The fluid flow through the tubular straining element 15, for example, is in the direction shown by the arrows 16. The fluid then flows through an outlet 17 (FIGURES 2 and 3) of the filter which, for example, is inserted into the outlet 14 of the chamber 11 in FIGURE 1.

The tubular straining element 15 may, for example, be formed of a fine mesh screen, or other porous, foraminous or permeable material, may be used. While the pleated faces of the accordion-like straining element 15 are shown as being essentially flat in FIGURES 1, 2 and 3, they may, if desired, be corrugated or pleated radially, as will be described in conjunction with FIGURES 6 and 7, or they may be of any other desired pattern, so as to provide an increased cross-sectional flow area. If desired, the faces of some of the sections or folds of the straining element may be corrugated or pleated, and others may be plain or flat. By appropriate distribution of the two types of folds, the effective "spring rate" of the bellows may be controlled, since corrugation, and particularly radial corrugations provide greater stiffness to the bellows.

The end plate 19 of the filter element may be formed of any suitable material, and it may be pervious or impervious. An internal compression spring 21 bears against the end plate 19 in order to maintain the filter element normally in an expanded condition. As the pleats of the porous tubular straining element 15 become clogged, and fill up with the solid particles which are entrained in the fluid passing through the chamber 11, the pressure differential across the filter 13 becomes greater and greater.

This increased pressure differential is reflected by an increasing pressure against the end plate 19, shown symbolically by the arrows 22, and the pressure differential tends to compress the bellows filter element against the force of the spring 21. As the bellows becomes more and more compressed, it becomes stronger and stronger against the danger of rupturing.

Finally, when the pleats of the tubular side member 15 are completely clogged, so that the filter is completely blocked, the bellows becomes completely compressed, as shown in FIGURE 3. This, of course, causes the filter element to present maximum strength against rupture by the differential pressure across the element.

It will also be appreciated that the filter element 13 may be easily removed and cleaned, whereby it again assumes the expanded configuration of FIGURE 2. The filter element, moreover, is advantageous in that it responds not only to clogging, but to any other condition which would produce an increased pressure differential thereacross.

That is, should the pressure of the fluid stream exceed certain maximum limits, the filter element of the invention would compress to the configuration of FIGURE 3, thereby preventing rupture of the element. If desired, sealing O-rings or gaskets 20 may be mounted on the edge of each pair of pleats of the side member 15. Then, when the bellows becomes almost fully compressed, the O-rings 20 effect sealing at the edges, as shown in FIGURE 3, and further protect the filter elements from rupture.

The response of the filter element of the invention to changes in differential pressure may also be used to actuate certain valves, so as to control the flow of the fluid stream, and thereby prevent rupture of the filter element, or other damage to the overall system. For example, such a mechanism and system are shown partially in section and partially in schematic form in FIGURE 4.

The illustrated system includes a fluid supply 100. Fluid from the supply 100 is fed through a regulator valve 102 in a line 104 to the inlet 106 of a chamber 107. A bellows type filter element 110 constructed, for example, in the manner described above, is disposed in the chamber 107 and extends through the outlet of the chamber. A further line 112 is disposed in the outlet, and the movable member of the filter element 110 is mechanically coupled to a shut-off valve 114 in that line.

The line 112 has an outlet 116 through which the fluid stream normally emerges. However, when the pressure differential across the filter element 110 exceeds a predetermined maximum threshold, the element compresses, so as to close the shut-off valve 114, thereby preventing the pressure differential from becoming any higher across the filter element.

A somewhat similar system is shown in FIGURE 5. In the latter system, the filter element 110 is disposed in a chamber 150. The line 104 from the fluid supply 100 introduces fluid into the chamber 150 through an inlet 152. The fluid passes through the filter element 110 and through a line 154 to the outlet 156 of the chamber.

A valve 158 is mechanically coupled to the movable member of the filter element 110, and is disposed at the end of the line 154; the valve 158 being in the nature of a by-pass valve. So long as the valve 158 is closed, fluid passes through the filter element 110, and through the line 154 to the outlet 156.

However, should the differential pressure exceed a predetermined maximum threshold, the element 110 compresses, so as to open the by-pass valve 158. This nullifies the pressure differential across the filter element 110, and effectively by-passes the filter element, so that it is protected.

The spring 21 may be omitted and its function incorporated into the side member 15, the joints of which may be made springy, to give an equivalent expanding bias to the bellows.

Suitable read-out sensors may be coupled to the movable member of the filter element 110 either in lieu of or in addition to the valve 158, so as to provide a continuous reading of the degree of contamination present in the filter. Such sensors are, per se, well known, and may be effected by mechanical linkage, or by magnetic, electrostatic, or other coupling which does not impair the integrity of the pressure-confining walls of the filter. A rudimentary example is shown in FIGURE 5 is in the form of a graduated gauge rod 161 secured to the movable end of the filter element 110, and passing through a packing gland 162 to the outside of the chamber 150. The reading on the gauge rod 161 is indicative of the pressure differential between chamber 110 and outlet 156.

Figure 7:
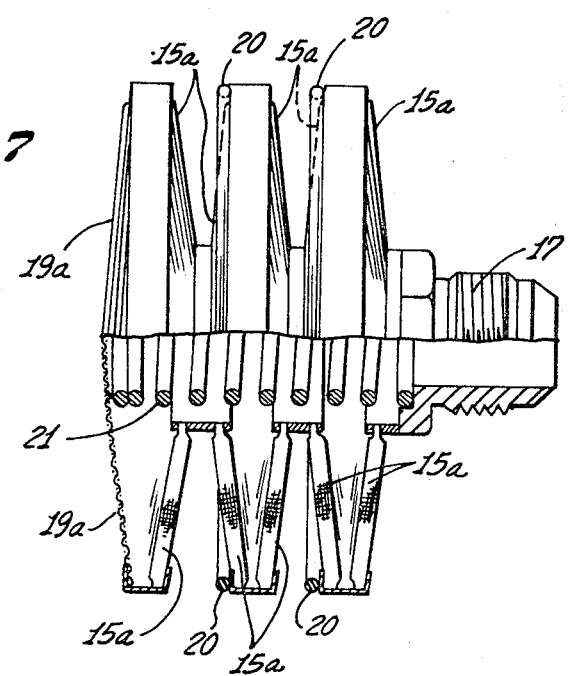
FIGURE 7 is a side view, partly in section, of the filter of FIGURE 6.

The embodiment of the invention shown in FIGURES 6 and 7 is generally similar to the filter of FIGURES 2 and 3, and similar components have been designated by the same numbers. The tubular straining element of the embodiment of FIGURES 6 and 7 is designated 15a, and the latter straining element is pleated radially, as shown, so as to provide increased cross-sectional flow area for the filter.

It will be observed in FIGURE 7 that the O-rings 20 are mounted on one side of the individual sections of the straining element 15a. The O-ring 20 performs the function described above, in that when the filter of FIGURE 7 becomes fully compressed, the O-rings effectively seal its edges, to protect the straining element 15a from rupture.

The radially pleated straining element 15a for each section of the filter of FIGURES 6 and 7 is formed by pleating each end of a tubular screen member, which is composed of an appropriate filter material, until each end of the tubular member assumes the configuration of a flat cone, that is, virtually a flat disc, this being achieved by pleating the ends of the tubular member, so as to provide radially pleated end portions 15a for each filter section extending between an inner diameter and the outer diameter of the section.

The result is that each section of the filter, as best shown in FIGURE 7, comprises a pair of opposed radially pleated essentially flat discs, each extending between an outer diameter and an inner diameter, with the adjacent sections forming a bellows-like collapsible filter.

As mentioned above, the straining element may be formed of a fine mesh metal, or it may be formed of paper, or other appropriate filter material. The end member 19a, which extends across the outer face of the end filter section in FIGURE 7, may be an impervious plate, as in the preceding embodiment, or it may be formed of a pleated screen material, as shown in FIGURES 6 and 7.

The filter of the invention may be used in conjunction with a conventional filter with flow either in series or in parallel, and it will perform all its functions and realize all its advantages.

As described, the filter has an important additional function apart from its self-protective feature, in that it can be used to control and meter the flow of fluid through it. This metering of the flow of fluid through the filter is brought about by the gradual closing down of the annular spaces between the folds of the straining element as the bellows compresses, or by causing the filter to actuate independent metering valve means, as described.

It will be appreciated that the embodiment shown in FIGURES 6 and 7 is advantageous in that it is susceptible to a modular construction. That is, the number of sections in the filter can be changed at will, and sections may be added or eliminated, depending upon the particular application involved.

Specifically, the various sections of the filter shown in FIGURES 6 and 7 may be threaded into one another, with male threads being provided on one side of each section, and female threads on the other. With such a construction, the filter assembly, moreover, may be easily taken apart for cleaning or other purposes.

As a modification, the various filter sections may be held together by suitable clamps, or other appropriate means may be used. For example, the known type of Marman clamp may be used, with appropriate O-rings, to hold the respective sections of the filter together.

Although the end plate 19a is shown in FIGURES 6 and 7 as composed of a pleated screen material, it will be appreciated that an impervious type of solid end plate, such as shown in the previous embodiments must be used to effectuate complete shut off of the filter, and to assure against rupture, when the filter becomes clogged, as described above.

It will be appreciated, therefore, that although particular embodiments of the elements and assembly of the present invention have been shown and described, modifications may be made. It is intended in the claims to cover all modifications which come within the scope of the invention.

What is claimed is:

1. A filter unit for straining entrained material from a pressurized fluid stream including: a porous and compressible bellows filter comprising a plurality of individual tubular sections, each of said sections having a pair of opposed sides having the configuration of a flat cone, and composed of radially pleated material extending between an inner peripheral edge and an impervious outer tubular member, and a sealing member mounted on one side of each said outer tubular member adjacent to the peripheral edge thereof and extending around such edge effectively to seal the edges of said tubular sections when the filter becomes fully compressed so as to protect the filter from rupture.

2. The filter unit defined in claim 1 in which said individual sections are detachable from one another, and said filter unit includes means for holding said sections together.

3. The filter unit defined in claim 1 in which said sides of said individual tubular sections are formed of radially pleated fine mesh material.

4. The filter unit defined in claim 1 in which said sealing member is in the form of an O-ring.

References Cited

UNITED STATES PATENTS

| 244,471 | 7/1881 | Moore | 210—91 |
| 1,442,677 | 1/1923 | MacArthur | 210—91 X |
| 2,184,761 | 12/1939 | Wier | 210—131 X |
| 3,053,395 | 9/1962 | Jaume | 210—493 |
| 3,216,571 | 11/1965 | Whiting et al. | 210—90 |
| 3,216,578 | 11/1965 | Wright et al. | 210—493 X |
| 3,261,474 | 7/1966 | Parker et al. | 210—487 |

FOREIGN PATENTS

| 240,532 | 9/1962 | Australia. |
| 303,763 | 1/1929 | Great Britain. |

SAMIH N. ZAHARNA, *Primary Examiner.*

U.S. Cl. X.R.

210—90, 131, 487, 493